United States Patent
Ueda

(10) Patent No.: US 7,816,054 B2
(45) Date of Patent: Oct. 19, 2010

(54) ELECTRONIC EQUIPMENT CONTAINING A FUEL CELL

(75) Inventor: Kazuyuki Ueda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 776 days.

(21) Appl. No.: 11/491,031

(22) Filed: Jul. 24, 2006

(65) Prior Publication Data
US 2007/0026287 A1 Feb. 1, 2007

(30) Foreign Application Priority Data
Aug. 1, 2005 (JP) ............................. 2005-223004

(51) Int. Cl.
*H01M 2/12* (2006.01)
*H01M 8/02* (2006.01)
(52) U.S. Cl. ..................... 429/505; 429/508; 429/512; 429/82
(58) Field of Classification Search ................... 429/34, 429/82, 96, 13, 23, 37; 396/176, 206; 348/372
See application file for complete search history.

(56) References Cited
U.S. PATENT DOCUMENTS
2004/0258976 A1  12/2004  Nishizawa ................... 429/34
2005/0012851 A1*  1/2005  Nishizawa et al. .......... 348/372
2005/0227136 A1*  10/2005  Kikuchi et al. ................ 429/34

FOREIGN PATENT DOCUMENTS
JP  2004212832 A  *  7/2004
JP  2005-17327  1/2005

OTHER PUBLICATIONS
Abstract of JP 2004-212832, Nishimura, Jul. 2004, English Translation.*

* cited by examiner

*Primary Examiner*—Jonathan Crepeau
*Assistant Examiner*—Kenneth Douyette
(74) *Attorney, Agent, or Firm*—Fitzpatrick, Cella, Harper & Scinto

(57) ABSTRACT

In order to provide small electronic equipment which can be used for a long time, electronic equipment includes a casing, a hold portion provided as part of the casing, for holding the equipment, and a fuel cell, in which a recessed portion provided in the hold portion has a vent hole formed therein for supplying air to the fuel cell. A fuel cell mounting chamber for containing the fuel cell is provided inside the hold portion. At least a part of the fuel cell mounting chamber and the vent hole provided in the recessed portion adjoin each other such that air is supplied from the vent hole to the fuel cell.

6 Claims, 4 Drawing Sheets

ELECTRONIC EQUIPMENT CONTAINING A FUEL CELL

BACKGROUND OF THE INVENTION

1. Field of the Invention

The present invention relates to an electronic equipment using a fuel cell as a power supply. In particular, the present invention relates to a small electronic equipment which uses, as a power supply, a fuel cell with a power generation of several milliwatts to several hundred watts, which can be carried around, and which allows a user to hold the equipment with his/her hand for use. Examples of the small electronic equipment include digital cameras, digital video cameras, small projectors, small printers, notebook computers, personal digital assistants (PDAs), and mobile telephones.

2. Description of the Related Art

Up to now, a lithium ion battery, a nickel manganese battery, an alkaline dry battery, or the like is often used as a power supply of a portable electronic equipment. Such a battery generates electric power through chemical reaction inside the battery. This is because the battery is often mounted in a battery chamber which is relatively hermetically sealed inside the portable electronic equipment. Further, functions of the electronic equipment are becoming more sophisticated and the electronic equipment is becoming more multifunctional, so a necessary amount of electricity is accordingly increasing. On the other hand, downsizing of the electronic equipment has been intended in terms of outer dimension. Density of capacitance of the above-mentioned various batteries does not necessarily materialize required improved performance of the electronic equipment.

Thus, an electronic equipment using a fuel cell as its power supply has emerged. However, since a fuel cell uses oxygen in the air to generate electric power, which is different from a conventional battery, an opening portion, which does not exist in a conventional portable electronic equipment, is necessary for making the battery chamber communicate with an outer surface of a casing of the electronic equipment.

Meanwhile, Japanese Patent Application Laid-Open No. 2005-017327 proposes an electronic equipment which utilizes a fuel cell as a power supply. The electronic equipment disclosed in Japanese Patent Application Laid-Open No. 2005-017327 is described with reference to FIG. 7. By providing an air hole 15 for making a battery chamber 18 provided in an electronic equipment 1 communicate with the outside of a casing in a portion of the electronic equipment 1 away from a portion held by a user, it is attempted to supply without fail oxygen to a fuel cell in the battery chamber 18. The electronic equipment in FIG. 7 additionally includes a release button 11, a light-emitting unit 12, a finder 13, and a lens barrel 14. An air-orifice guard 16, lid 17 and front cover 19 are also displayed.

However, provision of the air hole for communication with the fuel cell in a portion away from a portion held by a user as in JP 2005-17327 is a factor against downsizing of the electronic equipment which is required to utilize its outer surface portion as effectively as possible.

SUMMARY OF THE INVENTION

According to an aspect of the present invention, there is provided a small electronic equipment with a fuel cell mounted thereto which eliminates the necessity of increasing an outer surface area of a casing of the electronic equipment even though the fuel cell is mounted thereto and which allows a large cell capacity and thus long-duration use of the cell without a recharge.

According to another aspect of the present invention, there is provided an electronic equipment, including: a casing; a hold portion provided to a part of the casing so as to protrude from a surface of the casing, for allowing a user to hold the equipment; and a fuel cell, in which a recessed portion provided to the hold portion has a vent hole formed therein for supplying air to the fuel cell.

It is preferable that a fuel cell mounting chamber for containing the fuel cell be provided inside the hold portion.

It is preferable that at least a part of the fuel cell mounting chamber in the hold portion and a vent hole provided in a recessed portion adjoin to each other and air is supplied from the vent hole to the fuel cell contained in the fuel cell mounting chamber.

It is preferable that at least a part of the hold portion be formed of an air permeable member and the fuel cell be supplied with air through the air permeable member.

It is preferable that a fuel tank for the fuel cell be provided in the fuel cell mounting chamber.

It is preferable that the fuel tank contain a hydrogen absorbing alloy.

It is preferable that the electronic equipment be a camera held by a user with his/her hand for use.

According to the present invention, a small electronic equipment can be provided having a fuel cell mounted thereto, the capacity of the cell being large and thus the cell being able to be used for a long time without a recharge, without increasing an outer surface area of the casing.

Further features of the present invention will become apparent from the following description of exemplary embodiments with reference to the attached drawings.

DESCRIPTION OF THE EMBODIMENTS

Figure 1:
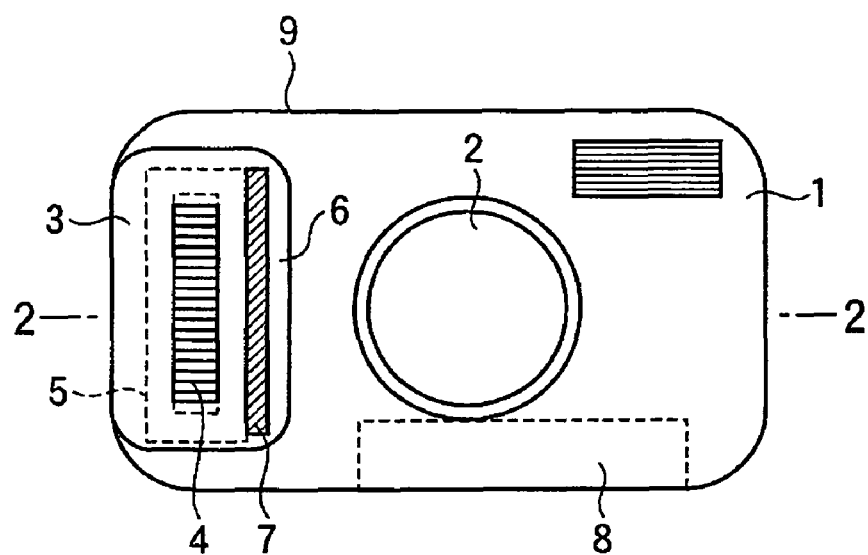
FIG. 1 is a schematic view illustrating a camera having a fuel cell mounted thereto, serving as an electronic equipment according to the present invention.

The present invention is described in detail in the following.

An electronic equipment according to the present invention is an electronic equipment having a fuel cell serving as a power supply and a hold portion provided in a part of a casing for holding the equipment. A vent hole for supplying air to the fuel cell is provided in a recessed portion provided in the hold portion.

According to this structure, the outer surface area of the casing of the electronic equipment is not increased even though the fuel cell is mounted, so a small electronic equipment which allows a large cell capacity and thus long-duration use without a recharge can be provided.

The hold portion of the casing is a portion provided so as to partially protrude from the surface of the casing, with which a user is allowed to grip and hold the electronic equipment for use. In the case of a camera, a grip portion corresponds to the hold portion.

Further, the electronic equipment according to the present invention is characterized in that the equipment has a fuel cell mounting chamber in the hold portion of the casing, and the fuel cell mounting chamber contains the fuel cell. By containing the fuel cell in the hold portion of the casing of the electronic equipment, the fuel cell can be protected against impact on the electronic equipment or the like, and thus, more reliable electronic equipment can be provided. It is also preferable from the viewpoint of weight balance.

Further, the electronic equipment according to the present invention is characterized in that at least a part of the hold portion having the fuel cell mounting chamber thereto is formed of an air permeable member. This structure makes it possible to supply air to the fuel cell also from the hold portion formed of the air permeable member. Together with the vent hole in the recessed portion of the hold portion of the casing, the part of the hold portion functions as the vent hole. Therefore, the amount of air which can be introduced when the fuel cell generates electric power is increased, and water vapor generated when the fuel cell generates electric power is efficiently discharged out of the casing of the electronic equipment. As a result, even though the fuel cell generates large electric power, insufficiency of oxygen and flooding do not occur and stable driving can be performed.

Further, the electronic equipment according to the present invention is characterized in that the fuel cell mounting chamber mounts a fuel tank for the fuel cell. This structure makes it possible to shorten a fuel path between the fuel tank and the fuel cell, which can decrease the resistance of the fuel in the channel.

Further, the electronic equipment according to the present invention is characterized in that the fuel tank includes a hydrogen absorbing alloy. Reaction for generating hydrogen from the hydrogen absorbing alloy is endothermic reaction. By making heat generated when the fuel cell contained in the casing of the electronic equipment generates electric power flow to the fuel tank which absorbs heat by the endothermic reaction when hydrogen is supplied from the hydrogen absorbing alloy, temperature inside the casing of the electronic equipment can be suppressed.

Further, the electronic equipment according to the present invention is characterized in that the device is a camera. The fuel cell can be, similarly to a conventional battery, contained in the casing of the camera, so a camera can be provided, the life of the battery of which for one recharge is long and the size of which is similar to the size of the electronic equipment using a conventional battery. Further, the present invention is similarly suitably applicable to electronic equipment such as a digital camera, a digital video camera, a small projector, a small printer, a notebook computer, a personal digital assistant (PDA), and a mobile telephone.

The present invention is described in more detail with the following embodiments of a portable electronic equipment. However, the present invention is not limited to the portable electronic equipment.

Embodiment 1

Figure 2:
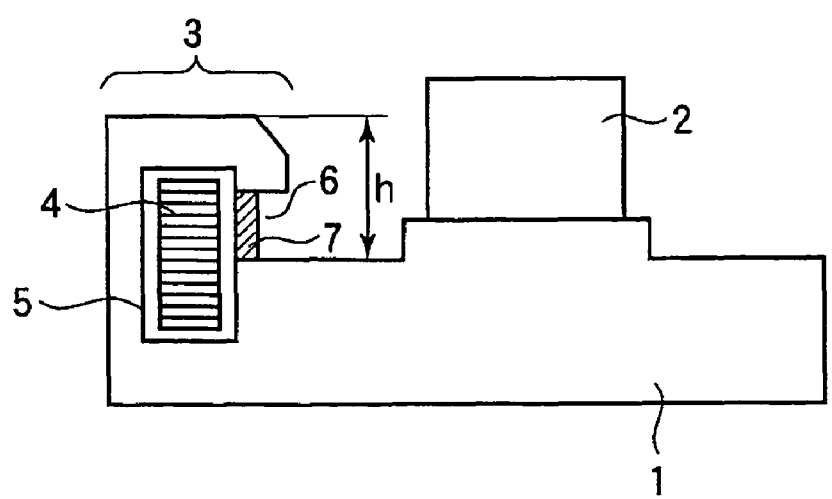
FIG. 2 is a schematic sectional view taken along the line 2-2 of FIG. 1.

An embodiment of the present invention is now described with reference to the accompanying drawings. FIG. 1 is a schematic plan view illustrating a camera having a fuel cell mounted thereto, serving as electronic equipment of this embodiment. FIG. 2 is a schematic sectional view taken along the line 2-2 of FIG. 1.

An example of outer dimensions of the camera according to the present invention shown in FIGS. 1 and 2 is 75 mm in depth×105 mm in width×75 mm in height.

In FIG. 1, an electronic equipment 1 is a camera. A lens 2 and a hold portion 3 which is shaped and sized so as to be easily gripped by a user when the user holds the electronic equipment 1 are provided in a part of a casing 9. The electronic equipment 1 is structured such that, when the lens 2 of the electronic equipment 1 is directed to a subject, in order to hold the electronic equipment 1 with stability, a user grips and holds the hold portion 3 which partially protrudes from the surface of the casing serving as a main body with the user's right hand covering the hold portion 3 to take a picture of the subject. The height h of the hold portion 3 from the surface of the main body is 5 mm to 40 mm.

A fuel cell 4 is contained in the hold portion 3. A fuel cell mounting chamber 5 is provided in the hold portion 3 and can contain the fuel cell 4. Outer dimensions of the fuel cell 4 are 30 mm in depth×20 mm in width×50 mm in height. Inner dimensions of the fuel cell mounting chamber 5 are 34 mm in depth×24 mm in width×52 mm in height. Even though the fuel cell 4 is mounted in the fuel cell mounting chamber 5, space remains around the fuel cell 4 such that air can flow into and water vapor can be discharged from the fuel cell mounting chamber 5 when the fuel cell 4 is driven. Further, the fuel cell 4 is supported by a guide (not shown) on an inner wall surface of the fuel cell mounting chamber 5 such that the fuel cell 4 does not rattle inside the fuel cell mounting chamber 5.

A recessed portion 6 is provided in a part of the hold portion 3 facing the lens 2 which is recessed from the surface of the hold portion 3. The recessed portion 6 functions as an air inlet/outlet. A vent hole 7 is provided in the recessed portion 6. The vent hole 7 provided in the recessed portion 6 is connected to the fuel cell mounting chamber 5, which communicates with the outside air through the vent hole 7. A wall of the vent hole 7 is formed of a resin member formed like a frame. A contaminant filter or a waterproof and air permeable filter for preventing entry of contaminants and water from outside can be provided in the vent hole 7.

A fuel tank 8 supplies fuel to the fuel cell 4 through a fuel path (not shown) for supplying fuel to the fuel cell 4.

The electronic equipment 1 serving as a camera according to this embodiment is structured such that, when the lens 2 is directed to a subject, in order to hold the electronic equipment 1 with stability, a user grips and holds the hold portion 3 with the user's right hand covering the hold portion 3 to take a picture of the subject. Since the recessed portion 6 provided so as to be recessed from the surface of the hold portion 3 is not blocked by a finger of the user's right hand, air can be supplied from the air inlet/outlet of the recessed portion 6 through the vent hole 7 to the fuel cell 4 in the fuel cell mounting chamber 5. Further, water vapor generated when electric power is generated can be discharged through the vent hole 7.

Since the recessed portion 6 is provided in a part of the hold portion 3, there is no need to additionally provide an area for an air inlet/outlet on the surface of the electronic equipment 1 serving as a camera, and thus, a small electronic equipment driven by a fuel cell can be materialized.

Embodiment 2

Figure 3:
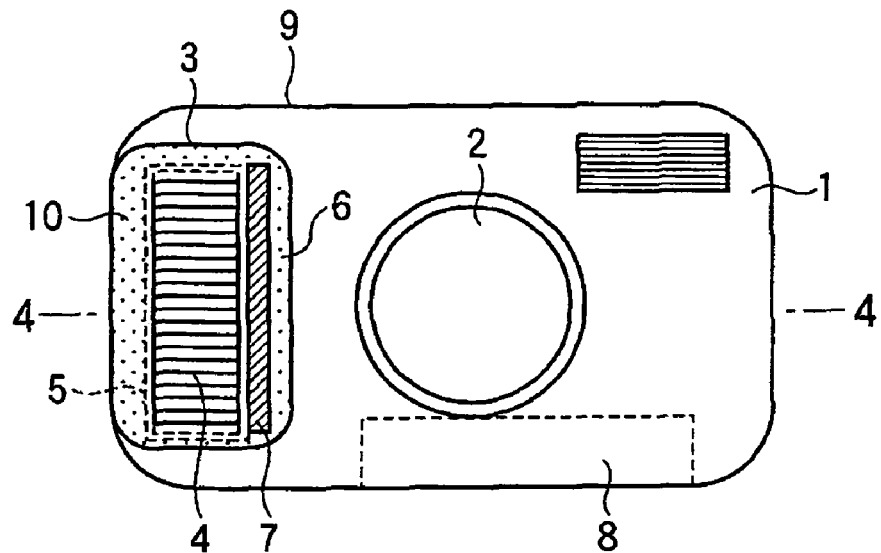
FIG. 3 is a schematic view illustrating another example of a camera having a fuel cell mounted thereto, serving as an electronic equipment according to the present invention.
Figure 4:
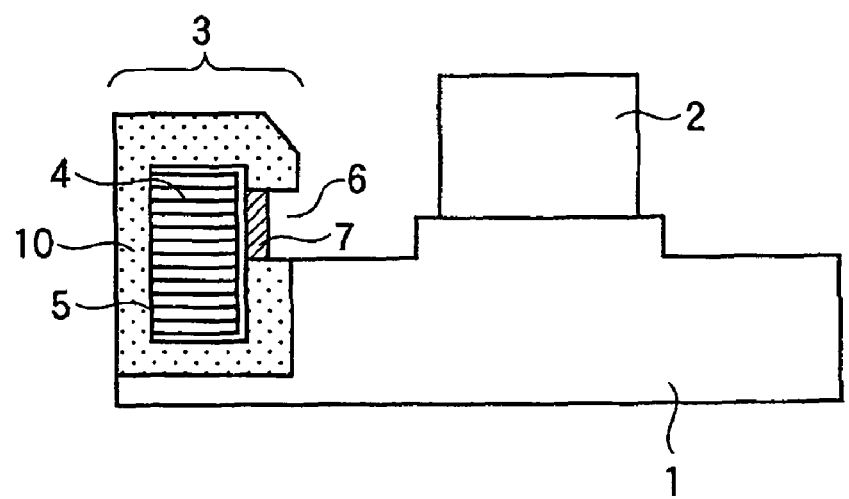
FIG. 4 is a schematic sectional view taken along the line 4-4 of FIG. 3.

Another embodiment of the present invention is now described with reference to FIGS. 3 and 4. The embodiment illustrated in FIGS. 3 and 4 is the electronic equipment 1 of Embodiment 1 illustrated in FIGS. 1 and 2 with a part thereof being modified to improve the performance. FIG. 3 is a schematic view illustrating another example of a camera serving as an electronic equipment according to the present invention, having a fuel cell mounted thereto. FIG. 4 is a schematic sectional view taken along the line 4-4 of FIG. 3.

An example of outer dimensions of the camera according to the present invention illustrated in FIGS. 3 and 4 is 72 mm in depth×102 mm in width×75 mm in height.

In FIG. 3, an electronic equipment 1 is a camera and has a hold portion 3 which is shaped and sized so as to be easily gripped by a user when the user holds the electronic equipment 1. The electronic equipment 1 is structured such that, when a lens 2 is directed to a subject, in order to hold the electronic equipment 1 with stability, a user grips and holds the hold portion 3 with the user's right hand covering the hold portion 3 to take a picture of the subject.

The hold portion 3 is formed of an air permeable member 10 at least a part of which is permeable to air. In this embodiment, the air permeable member 10 is made of foamed metal, the surface of which is insulated. However, the material of the air permeable member 10 is not limited thereto and can be any air permeable material including a honeycomb metal plate.

A fuel cell 4 is contained in the hold portion 3. A fuel cell mounting chamber 5 is provided in the hold portion 3 and contains the fuel cell 4. Outer dimensions of the fuel cell 4 are 30 mm in depth×20 mm in width×50 mm in height. Inner dimensions of the fuel cell mounting chamber 5 are 31 mm in depth×21 mm in width×52 mm in height. Even though the fuel cell 4 is mounted in the fuel cell mounting chamber 5, narrow space remains around the fuel cell 4. Since the hold portion 3 is formed of the air permeable member 10, air can flow into and water vapor can be discharged from the fuel cell mounting chamber 5 when the fuel cell 4 is driven. Further, the fuel cell 4 is supported by a guide (not shown) on an inner wall surface of the fuel cell mounting chamber 5 such that the fuel cell 4 does not rattle inside the fuel cell mounting chamber 5.

A recessed portion 6, which is provided in a part of the hold portion 3 facing the lens 2 which is recessed from the surface of the hold portion 3. The recessed portion 6 is an air inlet/outlet. A vent hole 7 is provided in the recessed portion 6 and the vent hole 7 is connected to the fuel cell mounting chamber 5, which communicates with the outside air through the vent hole 7. A contaminant filter or a waterproof and air permeable filter for preventing entry of contaminants and water from outside can be provided in the vent hole 7.

A fuel tank 8 supplies fuel to the fuel cell 4 through a fuel path (not shown) for supplying fuel to the fuel cell 4.

The electronic equipment 1 serving as a camera according to this embodiment is structured such that, when the lens 2 is directed to a subject, in order to hold the electronic equipment 1 with stability, a user grips and holds the hold portion 3 with the user's right hand covering the hold portion 3 to take a picture of the subject. Since the recessed portion 6 provided so as to be recessed from the surface of the hold portion 3 is not covered with a finger of the user's right hand, air can be supplied from the recessed portion 6 through the vent hole 7 and the air permeable member 10 which is permeable to air to the fuel cell 4 which generates electric power in the fuel cell mounting chamber 5. Further, water vapor generated due to electric power generation can be discharged through the vent hole 7. Further, since the hold portion 3 is formed of the air permeable member 10 and is permeable to air, when a user does not hold the camera serving as the electronic equipment 1, air can be supplied directly from the hold portion 3 to the fuel cell 4, and water vapor generated due to the electric power generation can be discharged.

Since the recessed portion 6 is provided in a part of the hold portion 3, there is no need to additionally provide an area for an air inlet/outlet on the surface of the electronic equipment 1 serving as a camera, and thus, a small electronic equipment driven by a fuel cell can be materialized. Further, because the fuel cell mounting chamber 5 can be downsized compared with the fuel cell mounting chamber in Embodiment 1, the camera serving as the electronic equipment 1 can be further downsized.

Embodiment 3

Figure 5:
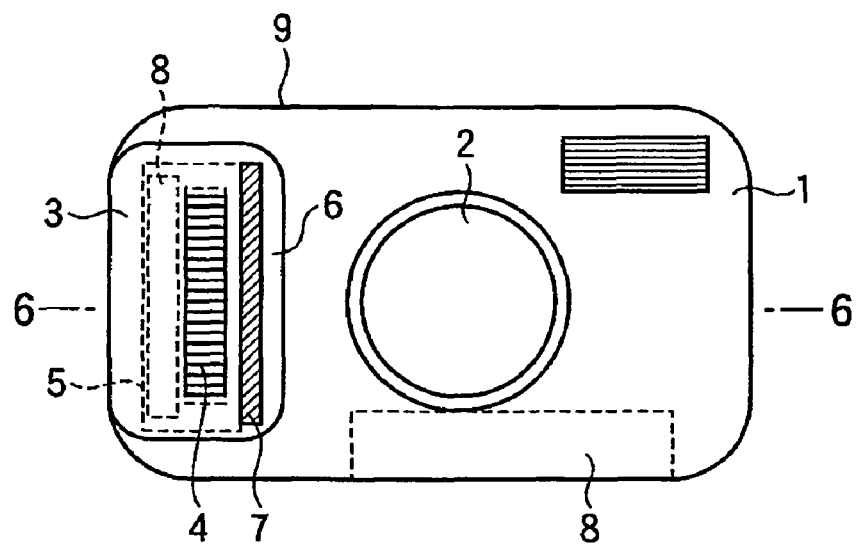
FIG. 5 is a schematic view illustrating still another example of a camera having a fuel cell mounted thereto, serving as an electronic equipment according to the present invention.
Figure 6:
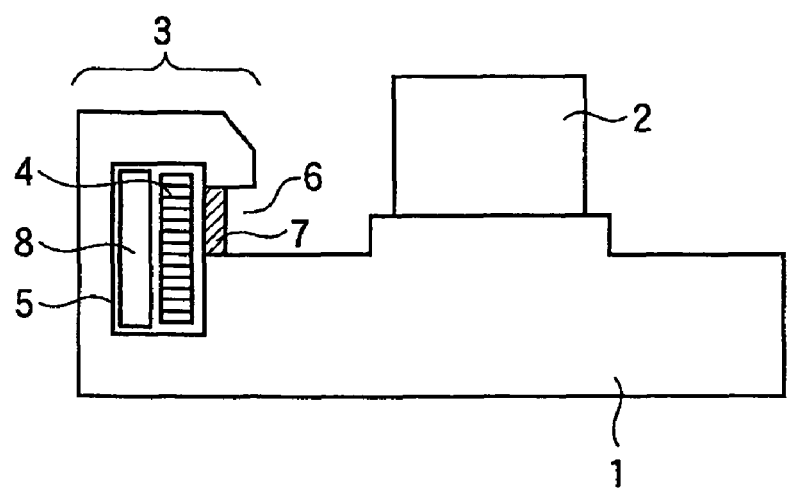
FIG. 6 is a schematic sectional view taken along the line 6-6 of FIG. 5.
Figure 7:
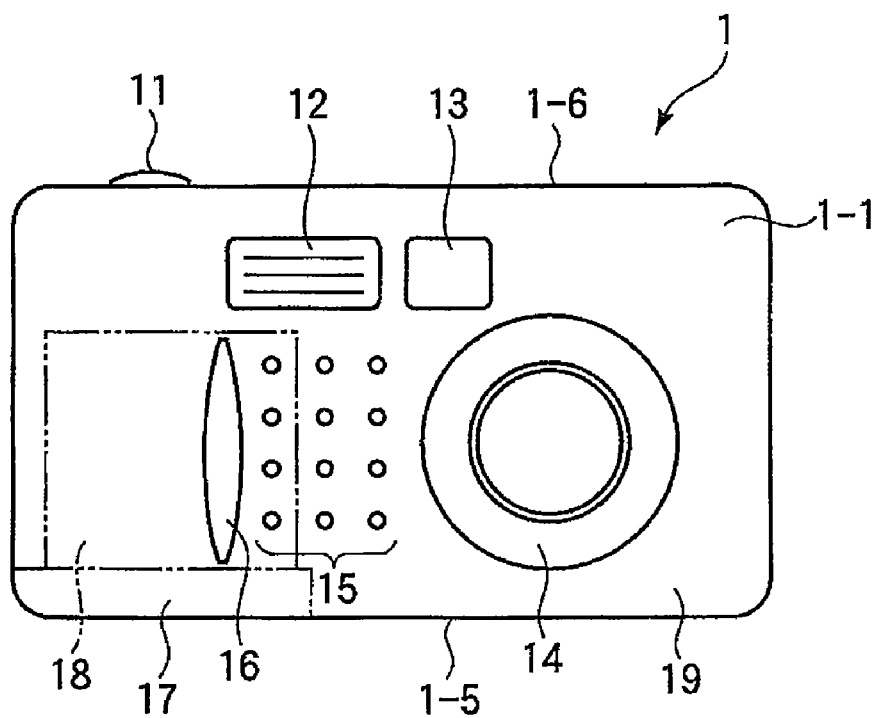
FIG. 7 is a schematic view illustrating a conventional electronic equipment.

Still another embodiment of the present invention is now described with reference to FIGS. 5 and 6. FIG. 5 is a schematic plan view illustrating still another example of a camera serving, as an electronic equipment of this embodiment, having a fuel cell mounted thereto. FIG. 6 is a schematic sectional view taken along the line 6-6 of FIG. 5.

An example of outer dimensions of the camera illustrated in FIGS. 5 and 6 is 75 mm in depth×111 mm in width×70 mm in height.

In FIG. 5, an electronic equipment 1 is a camera and has a hold portion 3 which is shaped and sized so as to be easily gripped by a user when the user holds the electronic equipment 1. The electronic equipment 1 is structured such that, when a lens 2 is directed to a subject, in order to hold the electronic equipment 1 with stability, a user grips and holds the hold portion 3 with the user's right hand covering the hold portion 3 to take a picture of the subject.

A fuel cell mounting chamber 5 is provided in the hold portion 3 and contains a fuel cell 4 and a fuel tank 8 for supplying fuel to the fuel cell 4. Outer dimensions of the fuel cell 4 are 30 mm in depth×20 mm in width×50 mm in height. Outer dimensions of the fuel tank 8 are 30 mm in depth×9 mm in width×50 mm in height. The fuel tank 8 of this embodiment is an aluminum container including a hydrogen absorbing alloy. However, the fuel tank 8 is not limited thereto and can employ any material as far as the tank is a fuel container.

Inner dimensions of the fuel cell mounting chamber 5 are 34 mm in depth×34 mm in width×52 mm in height. Even though the fuel cell 4 and the fuel tank 8 are mounted in the fuel cell mounting chamber 5, space remains around the fuel cell 4 and the fuel tank 8 such that air can flow into and water vapor can be discharged from the fuel cell mounting chamber 5 when the fuel cell 4 is driven. Further, the fuel cell 4 and the fuel tank 8 are supported by a guide (not shown) on an inner wall surface of the fuel cell mounting chamber 5 such that the fuel cell 4 and the fuel tank 8 does not rattle inside the fuel cell mounting chamber 5.

A recessed portion 6, which is provided in a part of the hold portion 3 facing the lens 2 which is recessed from the surface of the hold portion 3. The recessed portion 6 is an air inlet/outlet. A vent hole 7 is provided in the recessed portion 6 and the vent hole 7 is connected to the fuel cell mounting chamber 5, which communicates with the outside air through the vent hole 7. A contaminant filter or a waterproof and air permeable filter for preventing entry of contaminants and water from outside can be provided in the vent hole 7.

The electronic equipment 1 which is a camera according to this embodiment is structured such that, when the lens 2 is directed to a subject, in order to hold the electronic equipment 1 with stability, a user grips and holds the hold portion 3 with the user's right hand covering the hold portion 3 to take a picture of the subject. Since the recessed portion 6 provided so as to be recessed from the surface of the hold portion 3 is not covered with a finger of the user's right hand, air can be supplied from the recessed portion 6 through the vent hole 7 to the fuel cell 4 which generates electric power in the fuel cell mounting chamber 5. Further, water vapor generated due to electric power generation can be discharged through the vent hole 7.

Further, since the fuel tank 8 including the hydrogen absorbing alloy is contained together with the fuel cell 4 in the fuel cell mounting chamber 5, a fuel path between fuel cell 4 and the fuel tank 8 can be short, and the resistance of the fuel in the fuel path can be decreased. Further, when the fuel cell 4 consumes hydrogen due to electric power generation, since the fuel tank 8 alleviates temperature increase of the fuel cell 4 due to endothermic reaction when hydrogen is released from the hydrogen absorbing alloy, electric power generation performance of the fuel cell 4 can be made stable.

Since the recessed portion 6 is provided in a part of the hold portion 3, there is no need to additionally provide an area for an air inlet/outlet on the surface of the casing of the electronic equipment 1 serving as a camera, and thus, according to the present invention, a small electronic equipment driven with stability by a fuel cell can be materialized.

Accordingly, the present invention can be applicable to a small electronic equipment which uses, as a power supply, a fuel cell with a power generation of several milliwatts to several hundred watts, can be carried around, and allows a user to hold the electronic equipment with his/her hand for use. Examples of the small electronic equipment includes digital cameras, digital video cameras, small projectors, small printers, notebook computers, personal digital assistants (PDAs), and mobile telephones.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent application No. 2005-223004, filed Aug. 1, 2005 which is hereby incorporated by reference herein in its entirety.

What is claimed is:

1. An electronic equipment comprising:
   a casing having a front face and a rear face;
   from the front face of the casing, a hold portion provided as part of the casing and having a protruding portion protruding from the front face of the casing, for allowing a user to hold the electronic equipment, with the protruding portion having a surface facing a direction opposite from a lateral peripheral side of the casing, the surface having a first face and a second face recessed from the first face; and
   a fuel cell contained in the hold portion, wherein the second face has a vent hole formed therein for supplying air to the fuel cell.

2. The electronic equipment according to claim 1, wherein at least a part of the hold portion is formed of an air permeable member, and the fuel cell is supplied with air through the air permeable member.

3. The electronic equipment according to claim 1, wherein the electronic equipment is a camera, and the hold portion is provided as part of an outer surface of the casing, to which a lens is to be attached.

4. The electronic equipment according to claim 1, wherein the protruding portion has a first side facing the lateral peripheral side of the casing and a second side facing opposite to the first side and directed across the front face of the casing, with the surface of the protruding portion formed in the second side.

5. The electronic equipment according to claim 4, wherein the first side of the protruding portion has a common surface with the lateral peripheral side of the casing.

6. The electronic equipment according to claim 3, wherein the surface of the protruding portion faces the lens of the camera.

* * * * *